US006993410B2

(12) United States Patent
Esterling

(10) Patent No.: US 6,993,410 B2
(45) Date of Patent: Jan. 31, 2006

(54) ACTIVE ELECTROMAGNETIC DEVICE FOR MEASURING THE DYNAMIC RESPONSE OF A TOOL IN A CNC MACHINE

(75) Inventor: Donald M. Esterling, 201 Stable Rd., Carrboro, NC (US) 27510-4144

(73) Assignee: Donald M. Esterling, Carrboro, NC (US)

( * ) Notice: Subject to any disclaimer, the term of this patent is extended or adjusted under 35 U.S.C. 154(b) by 16 days.

(21) Appl. No.: 10/805,437

(22) Filed: Mar. 19, 2004

(65) Prior Publication Data
US 2004/0236529 A1    Nov. 25, 2004

Related U.S. Application Data

(60) Provisional application No. 60/456,948, filed on Mar. 25, 2003.

(51) Int. Cl.
*G01N 19/00* (2006.01)
(52) U.S. Cl. .................. 700/177; 159/173; 409/131; 73/660
(58) Field of Classification Search ................ 700/159, 700/173, 177; 409/131; 73/660
See application file for complete search history.

(56) References Cited

U.S. PATENT DOCUMENTS

| | | | |
|---|---|---|---|
| 6,349,600 B1 * | 2/2002 | Davies et al. ........... | 73/660 |
| 2002/0146296 A1 * | 10/2002 | Schmitz et al. ......... | 409/131 |
| 2004/0193308 A1 * | 9/2004 | Darcy et al. ............ | 700/182 |

OTHER PUBLICATIONS

"Active Control of Sheet Motion for a Hot-Dip Galvanizing Line"-Shelley et al. Sheet Dynamics, Ltd. Date unknown.*

"The Context of Experimental Modal Analysis"-Lieven et al. Royal Society of London, vol. 359, pp 5-10, 2001.*
"Modal Testing"-McConnell. Royal Society of London, vol. 359, pp 11-28, 2001.*
"Modal Analysis Indentification Techniques"-Maia et al, Royal Society of London, vol. 359, pp 29-40, 2001.*
"Signal Processing for experimental modal analysis"-Hammond et al. Royal Society of London, vol. 359, pp 41-59, 2001.*
D. M. Esterling, U.S. Provisional Appl. No. 60/456,948, filed Mar. 25, 2003, "Device for Measuring the Dynamic Response of a Tool in a CNC Machine".

(Continued)

*Primary Examiner*—Albert W. Paladini
*Assistant Examiner*—Michael D. Masinick

(57) ABSTRACT

The present invention provides a device for determining the dynamics of a tool sited in a CNC machine, as encapsulated by the Frequency Response Function. The device uses an actively controlled electromagnet to excite forces on the tool. The force is excited in a non-contact manner, allowing the force to be applied to both a stationary and a rotating tool. The displacement is measured by standard means, such as accelerometers, optical displacement or capacitance sensors. The ratio of the force and the displacement in the frequency domain is the Frequency Response Function. The force may be applied as a pure sine wave, providing the Frequency Response Function at the frequency of the sine wave. Varying the frequency of the sine wave provides the Frequency Response Function over the range of frequencies of interest. The control of the force profile is handled entirely by the automated controls and requires no special skills, training or manual interaction by the user. No separate force sensor is required, since the electromagnetic force on the tool may be accurately determined from the design of the electromagnet and the tool position, geometry and material.

1 Claim, 4 Drawing Sheets

OTHER PUBLICATIONS

D. M. Esterling, U.S. Provisional Appl. No. 60/456,947, filed Mar. 25, 2003, "Method for Measuring the Dynamic Response of a Tool in a CNC Machine".

"Manufacturing Processes and Equipment" by J. (George) Tlusty, Prentice Hall, Upper River Saddle, NJ (2000).

T. L. Schmitz and J. Ziegert, "Examination of Surface Location Error Due to Phasing of Cutter Vibrations," Precision Engr., vol. 28, pp. 51-62 (1999).

"Manufacturing Automation" by Y. Altintas, Cambridge Univ. Press (2000).

M.A. Davies, et al., "On the Dynamics of High-Speed Milling with Long Slender End Mills," Annals of CIRP, vol. 47/1, pp. 71-76 1998).

U.S. Appl. No. 6,349,600 "Device for Stable Speed Determination in Machining", Davies, et al., Feb. 26, 2002.

B. R. Jorgensen and Y.C. Shin, "Dynamics of Spindle-Bearing Systems at High Speeds Including Cutting Load Effects," J. Mfg. Sci. Engr., vol. 120, pp. 387-394 (1998).

M. A. Davies, et al., "Stability of Low Radial Immersion Milling," Annals of CIRP, vol. 49/1, pp. 37-40 (2000).

* cited by examiner

ACTIVE ELECTROMAGNETIC DEVICE FOR MEASURING THE DYNAMIC RESPONSE OF A TOOL IN A CNC MACHINE

CROSS-REFERENCE TO RELATED APPLICATIONS

The present application is entitled to the benefit of U.S. Provisional Application No. 60/456,948 filed Mar. 25, 2003, the entire disclosures and contents of which are hereby incorporated by reference.

BACKGROUND OF THE INVENTION

Common Abbreviations and Terms

The following are abbreviations and terms that will be used in portions of this application. For convenience, the abbreviations and terms are collected here for reference. Details on the particular meaning of each term may be found at the first use of the term.

CNC Computer Numerical Control

Type of machine tool whose operation is controlled by a computer. May also refer to the control itself or to the programming language used by the control.

FRF Frequency Response Function

Linear relation between an applied force and the resulting system displacement, expressed in the frequency domain.

1. Field of the Invention

This invention relates to generally to CNC (computer numerical control) programming and machining. The invention is a non-contact device for measuring the dynamics of a CNC machine and its tooling, as expressed in the Frequency Response Function. The device is simpler to use than currently available devices that take similar measurements, eliminating the need for specialized training and analysis. The device can measure the Frequency Response Function both for a stationary and a rotating tool.

2. Background

CNC programming consists of generating computer commands that are passed to a machine tool that has a CNC control. The commands instruct the control on what tool paths the machine tool should take and sets various machining conditions such as the feed, or speed the tool cuts into the part, and spindle speed, or the speed with which the tool rotates when cutting the part. There are many factors that can influence whether the as-machined part meets specifications. These include incorrectly programmed tool paths (e.g. tool gouging into a design surface), tool wear causing the actual cutting surface to be off-set from the expected cutting surface, and too aggressive feed values causing—for example—the tool to break or chip. These and similar factors may be classified as "static" errors. Another class of machining errors is related to "dynamic" or vibrational effects. A key determinant of these vibrational effects is the Frequency Response Function which is a measure of the CNC machine dynamics.

The Frequency Response Function is integral to determining the effect of machine dynamics on dynamic machine errors and part quality as explained by J. Tlusty in *Manufacturing Processed and Equipment*, Prentice Hall, Upper River Saddle, N.J. (2000); the entire contents and disclosures of which are hereby incorporated by reference.

Part errors arising from machine dynamics may be surface location errors from forced vibrations or chatter marks due to an instability in the cutting process. The invention is specific to the determination of the Frequency Response Function and these two sources of part errors are offered only as important examples of the use of the Frequency Response Function in CNC machining.

Surface location errors occur when the machined surface is not at the location expected from the CNC part program due to cutter dynamics (T. Schmitz and J. Ziegert, "Examination of Surface Location Error Due to Phasing of Cutter Vibrations," Precision Engineering, vol. 28, 51–62 (1999), the entire contents of which are incorporated hereby by reference). The Frequency Response Function is central to a reliable prediction of this effect, which can be as large or larger than geometric and thermal part errors.

There is a well established literature on chatter and its linkage to the dynamics of the CNC machine and its tooling as described in Y. Altintas, *Manufacturing Automation* (Cambridge University Press, 2000), the entire contents of which are hereby incorporated by reference. This dynamic information can be used to predict the safe depth of cut. The safe depth of cut depends strongly on the spindle speed as shown schematically in FIG. 1. A safe manufacturing operation could maintain depths of cut below D_Limit (as shown FIG. 1) or the operator can achieve much larger depths of cut and higher productivity, by operating at or near certain spindle speeds (e.g. S1 as shown in FIG. 1). Altintas summarizes decades of chatter research that demonstrates that both the limiting depth of cut (D-Limit) and the special spindle speeds (e.g. S1) depend on the dynamics of the CNC machine and its tooling.

Chatter may be attributed to various mechanisms. The most common mechanism is regenerative chatter, as described by Altintas and by Tlusty. ecently, Davies and collaborators (Davies, M. A., Dutterer, B., Pratt, J. and Schaut, A. J., On the Dynamics of High-Speed Milling with Long, Slender End Mills, Annals CIRP 47 (1), 71–76 (1998), the entire contents of which are incorporated hereby by reference) have proposed an alternate mechanism based on impact dynamics. The Frequency Response Function is central to prediction of all chatter mechanisms.

The present invention is a novel way to measure the dynamics, specifically the Frequency Response Function, of the CNC machine and its tooling. The invention allows these measurements to be made using a simple and inexpensive non-contact device. The invention allows these measurements to be made by a person skilled only in standard CNC operation, without any additional special training or complex analysis. The device may be used to measure the Frequency Response Function for a rotating, as well as a stationary, tool.

The present invention will provide CNC programmers and CNC machine operators with the dynamics information required to predict, in advance of cutting, when excessive forced vibrations and/or chatter may occur. In addition, the device will assist CNC programmers and operators in adjusting the parameters in the CNC program, such as the speed at which the tool rotates, to achieve optimal cutting conditions.

The device may be used to find the Frequency Response Function of individual tools or the measurements on one tool may be used to obtain the Frequency Response Functions for a collection of tools using a novel method and measurement strategy developed by Esterling, U.S. Provisional Patent Application No. 60/456,947, filed Mar. 25, 2003, the entire contents and disclosures of which are hereby incorporated by reference. Use of the Esterling method substantially reduces the number of required measurements with the device.

3. Description of Prior Art

The most commonly used procedure to determine the Frequency Response Function of a tool sited in a CNC is the hammer impact method. This method is described by Altintas and by N. Maia, et al., "Theoretical and Experimental Modal Analysis," John Wiley & Sons, NY, N.Y. (1997), the entire contents of each are hereby incorporated by reference. The operator hits the tool with a calibrated hammer. The hammer impact supplies a near-impulsive force profile. The resulting displacements are detected with a displacement sensor and the combined force and displacement signals are read and analyzed to produce the Frequency Response Function. This method requires considerable experience and dexterity with the testing procedure, as the hammer impact must be as clean and reproducible as is feasible. Since the hammer impact is manual, there is considerable variation between tests and multiple impacts for a single strike are common. The analysis system associated with the hammer impact tests requires skill in the use of complex electronics and interpretation of complex charts. These tests and their interpretation could not be expected of a typical shop floor machinist.

A device similar to our invention is described in U.S. Pat. No. 6,349,600 to Davies, et al., the entire disclosure and contents of which are hereby incorporated by reference. The Davies invention seeks to provide a guide to the best spindle speeds for a CNC machinist or programmer to use in order to avoid chatter. Normally, In order to predict chatter conditions, it is necessary to know the dynamics of the machine tool/workpiece, specifically as embodied in its Frequency Response Function. This function relates the time-varying displacement of the entity in response to a time-varying force. The invention of Davies, et. al., Device for Stable Speed Determination in Machining, explicitly states—in contrast to the current invention—that the device will not measure the Frequency Response Function. The Davies device only seeks to find special spindle speeds which correspond to specially stable (chatter-free) conditions. Doing so only requires finding the natural frequencies of the system. These correspond to the frequencies that exhibit peaks in the full Frequency Response Function. This simplifies somewhat their invention requirements but, as stated in the Description Section regarding the Davies Patent, prevents them from predicting the actual chatter-free depth of cut.

The best cutting speeds determined with the Davies device may be, and often are, exceptionally high speeds and are not attainable for many CNC machines. In addition, since the Davies device provides no guidance on the stable depths of cut at these or any other spindle speeds, the operator must determine the stable, chatter-free depths of cut by trial and error.

Our invention will determine the full Frequency Response Function. The frequencies corresponding to the peaks in the Frequency Response Function will determine the natural frequencies of the system and, from these, best cutting speeds. By measuring the full Frequency Response Function and by the operative chatter theories or their extensions, the device will predict stable depths of cut both at the best speeds and over a range of spindle speeds.

Our invention will obtain more useful information than the Davies, et. al. invention and will do so in a simpler fashion. A more detailed comparison between the Davies device and the present invention is provided in the Detailed Description of the invention.

SUMMARY OF THE INVENTION

The present invention will apply an actively shaped electromagnetic force to a tool sited in a CNC machine and measure the resulting displacement as a function of the frequency of the applied force. This will determine the dynamic response of the system, specifically the Frequency Response Function. This function, combined with operative forced vibration and chatter theories or their extensions, will determine acceptable depths of cut over a range of spindle speeds for a CNC machine. The present invention will, as part of this process, identify certain cutting speeds which are exceptionally stable with respect to chatter.

It is therefore an object of the present invention to provide a device for determining the Frequency Response Function of a tool sited in a CNC machine, using non-contact forces.

It is therefore an object of the present invention to provide a device for determining the Frequency Response Function of a tool sited in a CNC machine, which may be used by those with minimal expertise in machine-tool dynamics.

It is therefore an object of the present invention to provide a device for determining the Frequency Response Function of a tool sited in a CNC machine, which may be made relatively robust with respect to a machining environment.

It is therefore an object of the present invention to provide a device for determining the Frequency Response Function of a tool sited in a CNC machine, which may be used in combination with conventional chatter prediction and control schemes.

It is therefore an object of the present invention to provide a device for determining the Frequency Response Function of a tool sited in a CNC machine, which may make measurements on a stationary or a rotating tool.

According to one aspect, the present invention provides a device for determining the Frequency Response Function of a tool sited in a CNC machine, the device comprising: an electromagnet producing an actively shaped force field on a tool sited on the CNC machine and a measuring means for measuring the excitement of the tool by the excitation means.

BRIEF DESCRIPTION OF THE DRAWINGS

The invention is described in conjunction with the accompanying drawings, in which.

DETAILED DESCRIPTION OF THE PREFERRED EMBODIMENT

Definitions

For the purposes of the present invention, the term "machine" includes machines employing cutting tools such as: milling tools, lathe tools, etc. For the purposes of the present invention, the term "machining" refers to methods employing machine tools.

For the purposes of the present invention, the term "lathe tool" refers to any cutting tool, generally fixed, for cutting material that rotates relative to the cutting tool.

For the purposes of the present invention, the term "milling tool" refers to a cutting tool that rotates relative to the material the cutting tool cuts.

For the purposes of the present invention, "Frequency Response Function" is a function of frequency, having both real and imaginary components, which specifies both the magnitude and phase shift of the displacement response of a tool sited in a CNC machine relative to an applied sinusoid force at the particular frequency.

For the purposes of the present invention, a "spindle" refers to a device for rotating a milling tool, a lathe test bar, a milling test bar, a piece of material mounted on a lathe, etc.

For the purpose of the present invention, the term "flute" refers to one or more parts of a cutting tool that cuts a piece of material as the machine rotates. A flute may be a removable insert or may be a cutting projection that is part of a unitary cutting tool.

For the purposes of the present invention, the term "depth of cut" refers to the dimension of the chip produced by a cutting operation. In milling, there is an "axial depth of cut," measured perpendicular to the forward velocity of the tool cutting edge produced by the rotation of the spindle. In milling, there is also a "radial depth of cut," measured parallel to the principal tool axis. For lathes, there is simply a "depth of cut," measured perpendicular to the forward velocity of the tool cutting edge produced by the rotation of the spindle. When no modifier is attached to "depth of cut," reference is made to all of these depths of cut.

Figure 1:
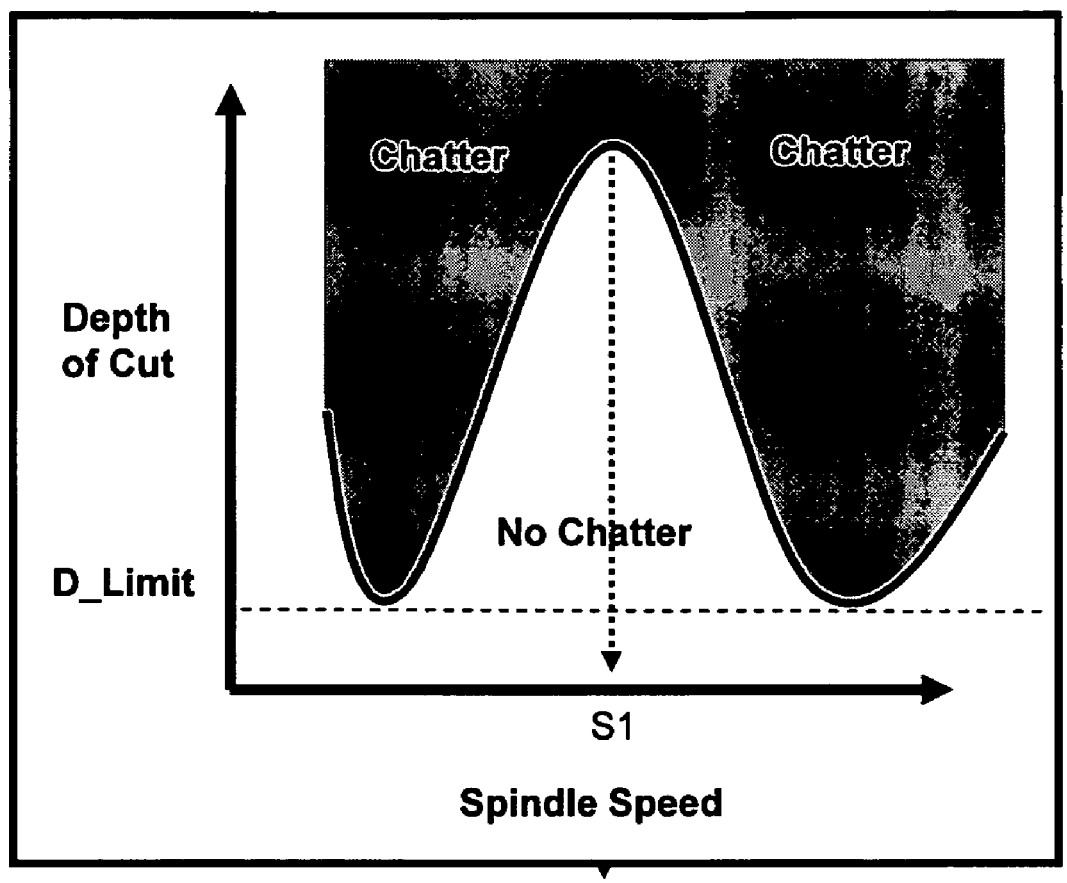
FIG. 1 is a chart showing regions of stable and unstable machining conditions. Chatter occurs in the unstable regions shown in grey. The vertical axis represents the depth of cut for a machining operation. This depth may represent either the axial or radial depth of cut for milling or the radial depth of cut for turning. The horizontal axis represents the spindle speed. Chatter occurs when the depth of cut is too large for a particular spindle speed. D_Limit indicates a depth of cut that is chatter free at all spindle speeds. S1 indicates a special spindle speed where an unusually large depth of cut can be made without chatter.

For the purposes of the present invention, with respect to a milling tool, the term "best stable speed" refers to a speed at which a milling tool is the most immune to the effects of chatter when compared to nearby cutting speeds, as shown, for example, by speed S1 in FIG. 1.

For the purposes of the present invention, with respect to a lathe tool, the term "best stable speed" refers to a speed at which a lathe spindle rotates a piece of a material so that the lathe tool is the most immune to the effects of chatter when compared to nearby cutting speeds, as shown, for example, by speed S1 in FIG. 1.

For the purposes of the present invention, with respect to a milling tool, the term "stable depth of cut" refers to a combination of an axial and radial depth of cut which lead to chatter-free machining for a particular milling tool operating at a particular spindle speed as shown, for example, by white areas in FIG. 1.

For the purposes of the present invention, with respect to a lathe tool, the term "stable depth of cut" refers to a axial depth of cut which leads to chatter-free machining for a particular lathe tool operating at a particular spindle speed as shown, for example, by white areas in FIG. 1.

DESCRIPTION

The dynamics of the machine tool and workpiece are an integral part of forced vibration and chatter prediction theory (Tlusty, Altintas). The dynamics is normally expressed as the Frequency Response Function, which relates the time-varying displacement of the entity in response to a time-varying force.

Figure 2:
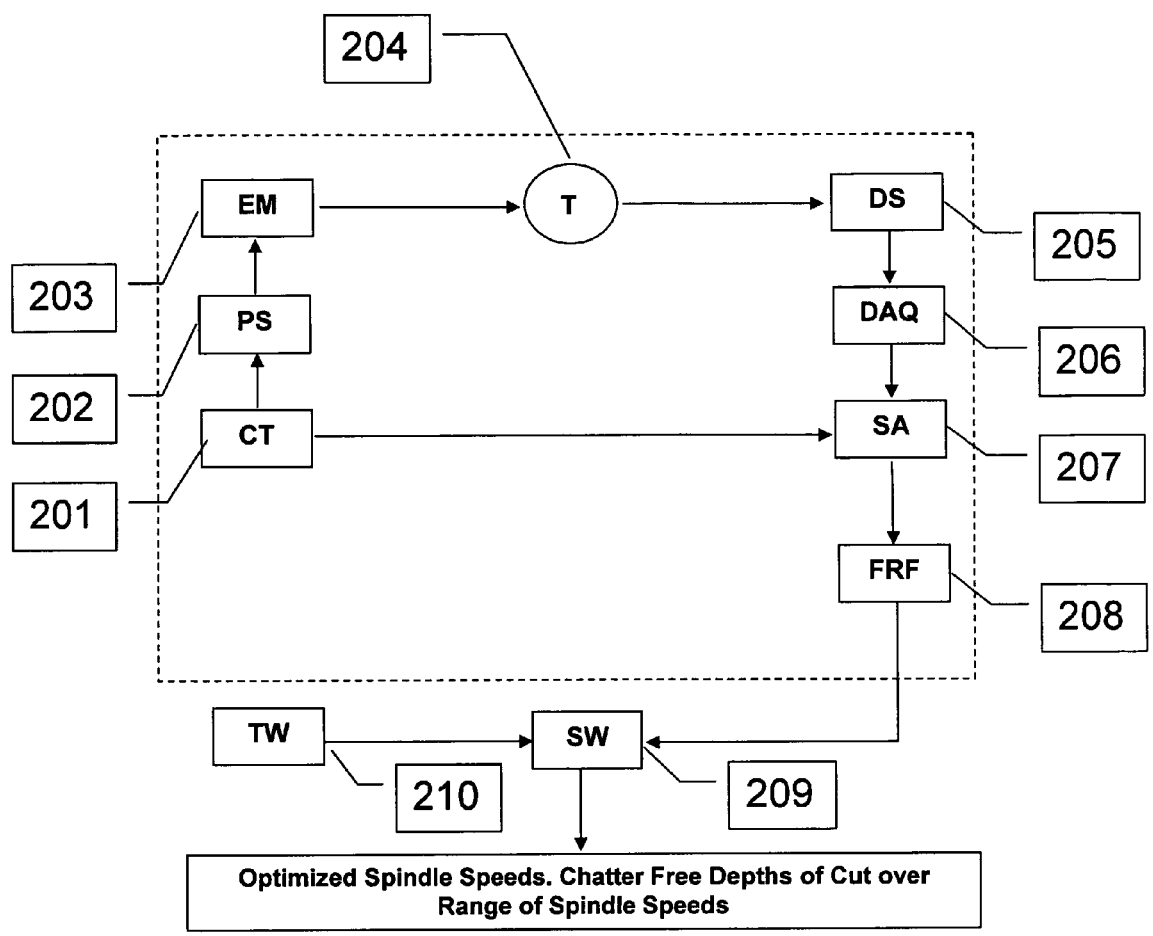
FIG. 2 is a schematic diagram of the invention. The device is contained within the dashed line in FIG. 2 with the output being the Frequency Response Function (FRF) for the particular tool T.

The present invention to measure the Frequency Response Function is outlined by the schematic block diagram in FIG. 2. The device proper is within the dashed line. The device may be linked with additional software modules for predicting forced tool vibrations as well as chatter effects, as indicated by the blocks outside of the dashed line.

The circular "T" 204 represents a tool held in a CNC machine. "EM" 203 represents an active electromagnet, which applies an actively shaped force to the tool. The electromagnetic field depends on the current output by the power supply "PS" 202, which is controlled by a controller "CT" 201. The displacement sensor "DS" 205 measures the displacement of the tool due to the applied force and outputs the data to a data acquisition system "DAQ" 206. The combined output current (and, hence, forces) and displacement data is read by a signal analysis program "SA" 207 which then computes the Frequency Response Function "FRF" 208.

This information may be read by a tool vibration or chatter analysis software program "SW" 209 which combines information about the tool and workpiece "TW" 210, e.g. the type of material being cut, the diameter and number of flutes on the tool to output optimal spindle speeds and stable depths of cut over a range of spindle speeds.

The tool "T" in FIG. 2 may be a milling, a lathe tool or any magnetically active tool set in any CNC machine.

The force on the tool "T" due to the electromagnet "EM" does not need to be measured by a special force sensor. We can accurately and reliably predict forces simply by knowing the current from the power supply to the electromagnetic actuator, along with the tool position, material and geometry. The ability of the device to determine applied forces without the cost and added complexity of a force sensor is an important advantage over standard Frequency Response Function measuring devices.

The electromagnetic force in the present invention is automatically controlled for the operator by the controller ("CT") adjusting the current to the electromagnetic actuator. No special skills are required of the operator. The entire control of the active force profile is transparent to the user.

The electromagnetic forces in the current invention are actively shaped, e.g. into a sine wave, by controlling the input current. This provides a level of precision and control absent in all other currently available devices for measuring the Frequency Response Function.

The electromagnetic force is non-contact. This contrasts with the current commonly used hammer impact method to obtain the Frequency Response Function (FRF) as described by Altintas and by Maia. The manual hammer impact method requires considerable experience and dexterity to avoid multiple "bounces" of the tool for a single strike and to obtain even reasonably reproducible results. The analysis is complex and can require expensive equipment. These tests and their interpretation could not be expected of a typical shop floor machinist.

The hammer test is not suitable for obtaining the FRF when the spindle is rotating. There is evidence in the literature that the FRF changes as the spindle is rotating as in B. R. Jorgensen and Y. C. Shin, "Dynamics of Spindle- Bearing Systems at High Speeds Including Cutting Load Effects," J. Mfg. Sci. Engr., Vol. 120, 387–394 (1998), the entire contents of each are hereby incorporated by reference. This variation may, for example, be due to movement in the ball bearings in the spindle under the centrifugal force of the spindle rotation. The spindle is only part of the system that contributes to the Frequency Response Function at the tool. The tool holder may also change its dynamic characteristics. Often the tool holder is drawn up into the spindle as the spindle rotates due to the tapered shape of the tool holder—spindle interface. Since our device is non-contact, it is also well suited to determining the Frequency Response of a rotating tool.

The advantages of the present device over standard hammer impact measurements of the FRF may be summarized as: [1] The device is non-contact with an automatically controlled and shaped electromagnetic force. The hammer test requires contact with the tool, with a near-impulsive force profile whose shape depends on the manual dexterity and experience of the user. [2] As a non-contact device, measurements may be taken on a rotating as well as a stationary tool. Hammer impact tests are difficult to impossible when attempting impact on a rapidly rotating tool surface. [3] No separate and expensive force sensor is required. The electromagnetic force on the tool may be accurately known from the design of the electromagnet, the current supplied to the electromagnet and the tool position, geometry and material.

Detailed Comparison with Davies Invention

The Davies invention is an important advance in assisting users in determining the best spindle speeds to use to avoid chatter. The Davies invention is based on a theory of machine dynamics. There are important similarities and differences between our invention and the Davies invention as summarized in the following Table. Each entry is then discussed in more detail in the indicated numbered sections that follow.

|  |  | Davies | Present Invention |
|---|---|---|---|
| Applies to Mills and Lathes | [1] | Yes | Yes |
| Non-Contact Forces | [1] | Yes | Yes |
| Electromagnetic (EM) Force Field | [1] | Yes | Yes |
| Output Signal is Weak and Noisy | [2] | Yes | No |
| Tested on an Industrial Tool | [2] | No | Yes |
| EM Field is Active or Fixed | [3] | Fixed | Active |
| Applied Force Profile can be controlled | [3] | No | Yes |
| Natural Frequencies/Best Speeds | [4] | Yes | Yes |
| Spindle must rotate for measurements | [5] | Yes | No |
| Effect of Spindle Speed on Freq. Response Function | [6] | No | Yes |
| Stable Depths of Cut | [7] | No | Yes |
| Freq. Response Function | [8] | No | Yes |
| Chatter Mechanisms | [9] | Regenerative | General |

[1] Non-contact Electromagnetic Force Field

Both the present device and the Davies device are applicable to mills and lathes as well as other CNC machines. Both the present device and the Davies device produce variable forces on the tool from a variation in an electromagnetic field. As such, both devices are non-contact, in contrast to the hammer impact technique. The non-contact nature of the forces allows the forces to be introduced with automatic controls. This is in contrast to hammer impact methods which are manual, require considerable dexterity and experience and, by their very nature, can not be carefully controlled.

In the Davies invention, the variation in the electromagnetic field is obtained by rotating the tool past a fixed magnet (permanent or electromagnet). The shape of the electromagnetic force is determined by the variable tool geometry, such as the flutes in a milling tool. As the flute sweeps past the magnet, the electromagnetic forces vary. The rate of variation of the force is set by the spindle speed. This device only provides direct control over the rate of variation in the forces while the shape of the force profile is fixed by the flute geometry.

[2] Force Profile and Signal for Industrial Tools

Control over the force profile is important to provide a clean, unambiguous force to the tool. The embodiment in the Davies invention uses a simple rod ground to a flat at the end, so the tool "flute" is actually a single thin, straight plane with a "flute" width equal to the tool diameter. This is a very different geometry than a typical industrial tool with multiple flutes ground in a helical (twisted) pattern and flute depths are only a fraction of the tool diameter. The forces generated by rotating a complex shaped industrial tool, with helical flutes, past a fixed magnetic field will be quite different from that of the rotating straight thin planar artifact used in the Davies embodiment. The forces with an industrial tool in the Davies invention will be both weak and noisy relative to the robust and accurately controlled forces from our invention.

[3] Actively Controlled Force Field

The present invention does not depend on the tool geometry to induce a suitable variable force field. The variation in the electromagnetic field is accomplished by actively controlling the current to an electromagnet. The present device can produce a suitable signal with a standard shaped industrial tool.

[4] Best Spindle Speeds

The best spindle speeds—those most immune to regenerative chatter—are related to the natural frequencies of the CNC machine as stated in the Davies Patent. The natural frequencies correspond to peaks in the Frequency Response Function. Our invention will determine the Frequency Response Function over a range of frequencies and, by so doing, identify the peaks needed to predict optimal spindle speeds.

[5] Spindle is Not Required to Rotate

The Davies device requires the operator to ramp the spindle speed from zero to maximum speed to detect the resonant frequencies. Our device does not require the spindle to rotate at all, simplifying the measurement process. This simplification is more than time-savings. All tools are slightly off center. This is known as "run-out." The wobbling of the tool due to run-out will itself introduce noise or unwanted variations in the signal detected by the Davies device. The present invention is a measurement device that does not require a rotating tool or spindle, which eliminates this source of error, thereby making the device more practical in actual shop application as opposed to highly controlled laboratory measurements.

Our device only requires the machine operator to place the tool (held in the CNC machine of interest) at a designated location inside our device. CNC machines have an extremely accurate positioning capability that is integral to its operation. The positioning of the tool to a designated location is a familiar operation to CNC operators. A simple yes/no signal will tell the operator when the tool is properly sited. The siting operation will be similar to a "tool touch off" operation routinely done by machinists to set the origin for their part program.

[6] Effect of Spindle Speed on Frequency Response Function

The present device can also measure the Frequency Response Function as the spindle rotates. In this case, some care must be taken to reduce the effects of runout and/or the runout must be measured and the data must be duly compensated. This makes the measurements more difficult for a rotating spindle. In contrast to the Davies device, we can set the spindle speed to fixed values and determine the effect of spindle speed on the Frequency Response Function. The Davies device requires a sweep over all spindle speeds to select the natural frequencies of the system (and, so, the best spindle speeds) using a theory that assumes there is no variation of the Frequency Response Function with spindle speed.

[7] Stable Depths of Cut

The determination of stable (chatter free) depths of cut over a range of spindle speeds is important for the optimal use of CNC machines. The "best" spindle speeds determined by the peaks in the Frequency Response Function allow high speed CNC machines to machine at depths of cut which are much larger than those available at moderate spindle speeds. This leads to higher productivity. However, the CNC operator can only take full advantage of this higher productivity if they know what are the limiting stable depths of cut at these and other spindle speeds. The Davies invention requires the CNC operator to determine these stable depths by trial and error. The current invention, by determining the Frequency Response Function and by using operative chatter prediction theories, provides the CNC operator with the stable depths of cut over a range of spindle speeds without the need to carry out onerous cutting tests.

The "best" spindle speeds are often well in excess of 10,000 RPM and even 20,000 RPM—well beyond the capability of many CNC machines currently in use. Chatter and the prediction of its onset is a practical concern at low to moderate as well as high spindle speeds. Tlusty, among others, has shown that there is a critical depth of cut at all spindle speeds below which there is no chatter (the D_Limit line shown in FIG. 1). While this critical depth of cut may be much less than the stable depths of cut at the special spindle speeds, this limiting and as well as stable cutting depths at all spindle speeds are of industrial importance. The special speeds may not be attainable by the CNC machine in use and/or there may be other operator reasons mitigating against machining at very high speeds.

The "safe at any spindle speed" depth of cut along with a table of the stable depths of cut over the operating range of spindle speeds will assist in the development of chatter free programs for CNC machines. The CNC programmer can instruct the CNC machine to operate at an optimal, but still safe, depth of cut for normal speeds and at exceptional stable depths of cut at high spindle speeds.

[8] Frequency Response Function

The Davies device explicitly avoids measurement of the Frequency Response Function. The device only predicts special spindle speeds where there are particularly stable (chatter free conditions). As Davies state in their Patent, these predicted spindle speeds may be related to the natural frequencies of the system. These natural frequencies correspond to peaks in the Frequency Response Function. Avoiding the measurement of the entire Frequency Response Function and only measuring the natural frequencies simplifies their invention somewhat. However, the CNC operator has no information from the Davies device about the stable depths of cut at the special speeds or at any spindle speed. They must determine the stable depths of cut by trial and error.

The device of the current invention will be at least as simple to operate as the Davies device, while providing the entire Frequency Response Function. This enables users to know, in advance, both the best spindle speeds and the limiting stable depths of cut at all spindle speeds

[9] Chatter Mechanisms

The Davies device relies on a theory of a particular chatter mechanism known as "regenerative chatter." Other chatter mechanisms include mode coupling (Tlusty) and impact dynamics, the latter best described by M. Davies, et. al., The Stability of Low Radial Immersion Milling, Annals of the CIRP, vol. 49(1), 37–40 (2000). The Davies device is not able to distinguish among these various chatter mechanisms, nor assess their relative importance, since the Davies device does not determine stable depths of cut associated with these different mechanisms. The Frequency Response Function contains sufficient information to model each of these chatter mechanisms and so is able to handle chatter due to a multiplicity of mechanisms.

EXAMPLE

A test version of the present invention was developed for a milling environment.

The test version consisted of a tool sited in a CNC machine, an electromagnetic actuator, voltage detectors, a power supply, a controller board to control the power output to the actuator and a user interface device. The later informs the user when the tool is properly sited relative to the electromagnetic actuator, starts the measurement process and records the data. The user interface device for the example was a laptop computer.

Figure 3:
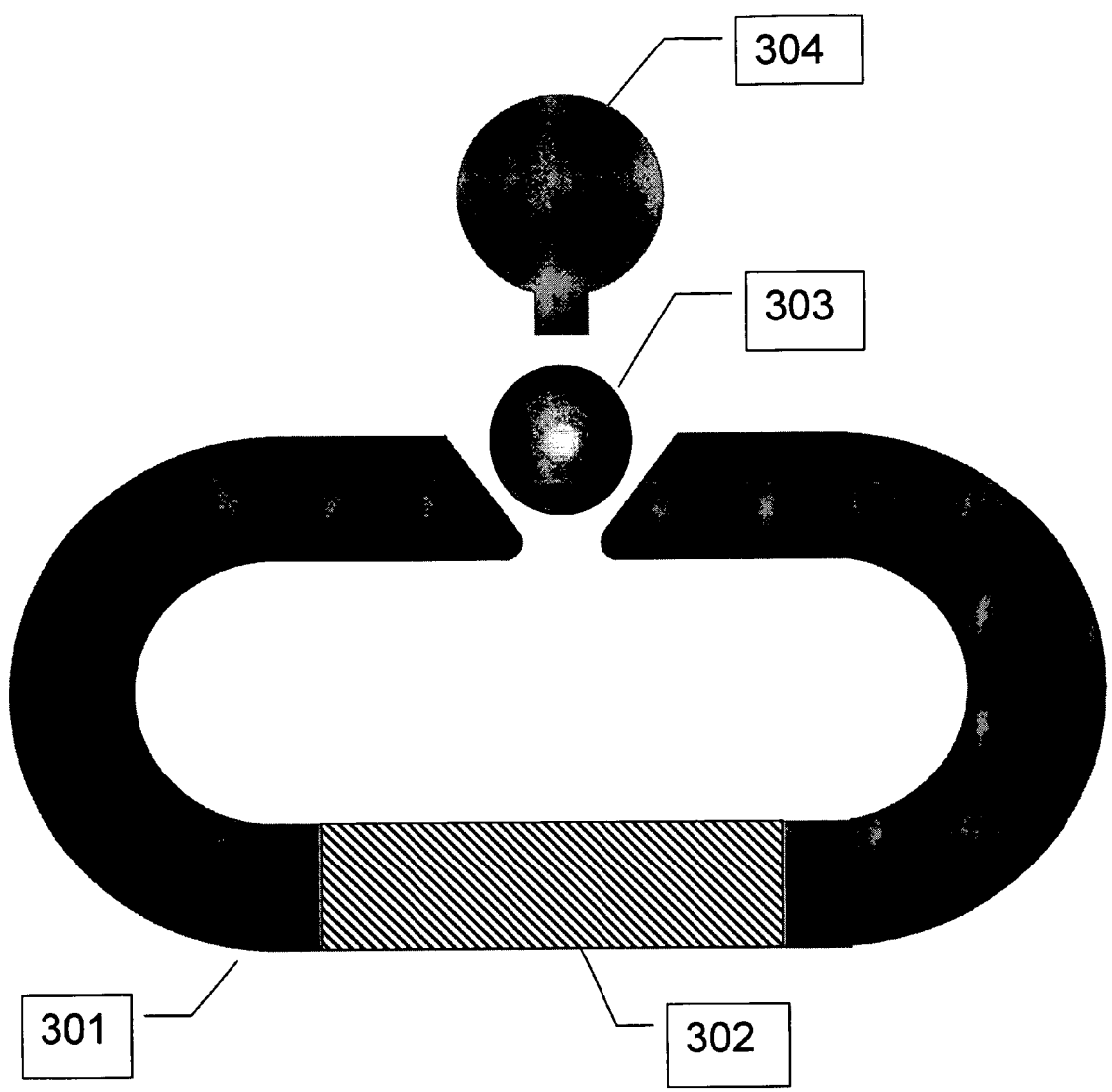
FIG. 3 is a schematic planar cross-sectional view of the device.

FIG. 3 is a schematic planar cross-sectional view of the device. The electromagnet 101 is driven by an alternating current applied to a wire coli 102. The electromagnet induces a force on a magnetically active tool 103, causing a displacement which is measured by a sensor 104. The force applied to the tool 103 is controlled by the current supplied to the coil 102. By applying currents with different frequency profiles to the electromagnet, a frequency dependent force is, in turn, applied to the tool. The Frequency Response Function is obtained by combining the measured displacement with the applied force as explained, for example, by Altintas and by Maia.

The electromagnetic actuator and its housing were fixtured to the machine-tool bed. The housing is aligned with the machine tool principal axes. For a three axis machine tool, this meant aligning the housing along the machine X and Y axes, with the tool aligned along the machine Z axis. The machine operator used the CNC control to precisely position the tool relative to the electromagnetic actuator.

Once the tool is in place inside the device, a time-varying magnetic field was applied to the tool by the electromagnetic actuator. The resulting displacements were measured by an optical displacement sensor. To complete the measurement of the Frequency Response Function, we need to know the applied force as a function of time.

Force sensors are expensive. Our design will allow us to do away entirely with force sensors. We compared a predicted force, based on the known geometry of the electromagnetic actuator, the tool, the gap between them, windings in the actuator and the current in those windings, with a measured force. They were in very close agreement. The conclusion is that if we accurately fix the static gap between the electromagnetic actuator and the special tool, both of which have pre-determined and fixed geometries, we may accurately predict the applied forces without any special force sensors.

The applied force is sinusoidal in form with known amplitude and frequency. The applied frequency is held at a specific frequency to take and record a displacement measurement and then progressively swept up and held over a frequency range of interest (typically zero to two thousand hertz).

The time-varying displacements and forces were Fourier transformed to the frequency domain. The Frequency Response Function is the Fourier transformed displacement divided by the Fourier transformed force. This function was recorded on the user interface device and may be used with a software analysis program that predicts chatter or forced tool vibrations.

Figure 4:
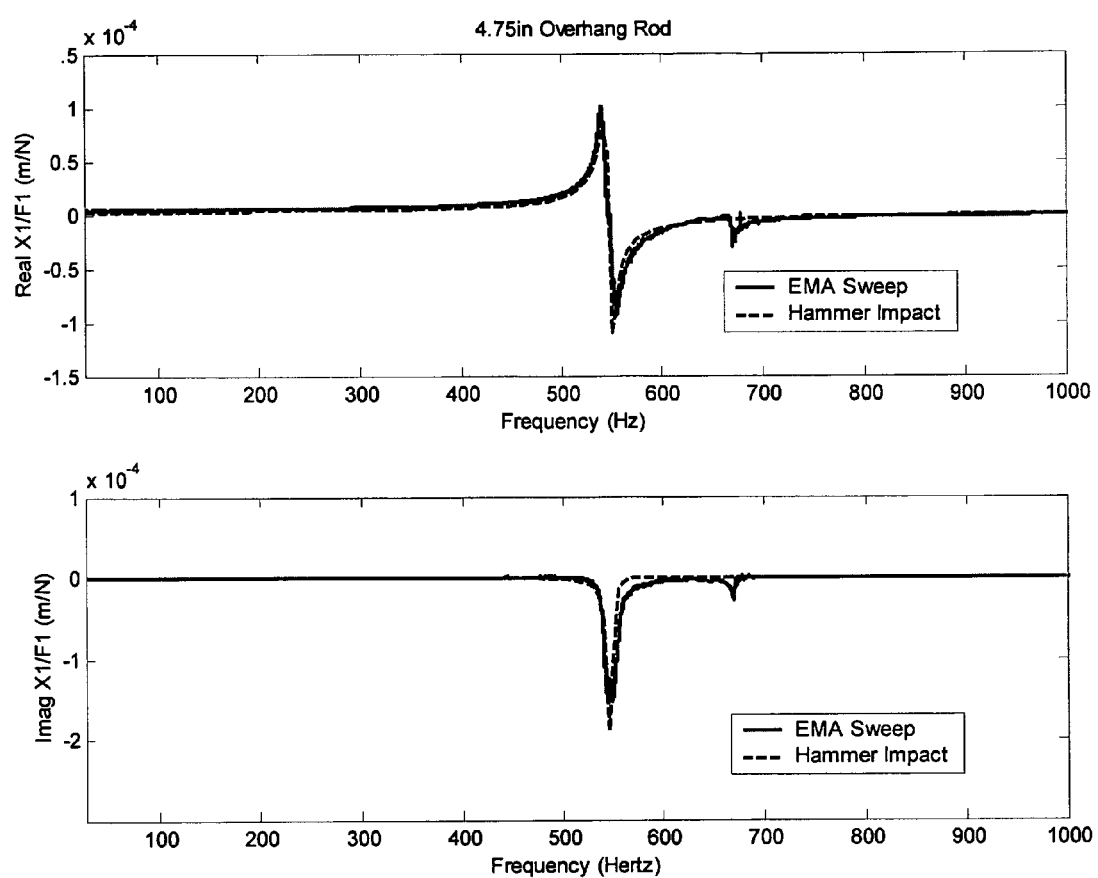
FIG. 4 is a chart showing the comparison of the real and imaginary components of the Frequency Response Function of a flat end blank tool, with 4.75 inch overhang.

The results have been compared to those from standard hammer impact tests. The resonant frequencies and peak widths in the Frequency Response Functions from the two methods are in close agreement. FIG. 4 shows the resulting Frequency Response Function when a swept sine wave force is applied to a flat end tool blank with a 4.75 inch overhang (length below the base of the tool holder). The predicted resonant frequency matches that from a standard hammer impact test, both at approximately 550 Hz. The damping (related to the height of the Frequency Response Function) is also very similar to the hammer impact results.

This indicates the present invention can measure the Frequency Response Function for a tool in a CNC with an accuracy comparable to that from a hammer impact test, but without the associated complex and expensive equipment and attendant training.

What is claimed is:

1. A device for determining the dynamics of a tool sited in a computer numeric control (CNC) machine, the device performing the steps of:
    exerting a pure sine wave excitation force on the tool using an active electromagnet;
    measuring the displacement of the tool using displacement measuring means;
    calculating the frequency response function at the frequency of the sine wave;
    varying the frequency of the sine wave and calculating the frequency response function over a range of frequencies; and
    using the calculated frequency response functions for the range of frequencies, identifying peaks needed to predict optimal spindle speeds.

* * * * *